United States Patent
Buell

(10) Patent No.: US 8,056,668 B2
(45) Date of Patent: Nov. 15, 2011

(54) RADIATOR MOUNTING FOR A MOTORCYCLE

(75) Inventor: Erik F. Buell, Mukwonago, WI (US)

(73) Assignee: Buell Motorcycle Company, East Troy, WI (US)

(*) Notice: Subject to any disclaimer, the term of this patent is extended or adjusted under 35 U.S.C. 154(b) by 0 days.

(21) Appl. No.: 12/788,088

(22) Filed: May 26, 2010

(65) Prior Publication Data

US 2010/0230200 A1 Sep. 16, 2010

Related U.S. Application Data

(63) Continuation of application No. 11/765,524, filed on Jun. 20, 2007, now Pat. No. 7,743,868.

(51) Int. Cl.
*B62D 61/02* (2006.01)
(52) U.S. Cl. .................................. 180/229; 180/219
(58) Field of Classification Search .................. 180/229, 180/68.1, 219, 220, 68.2, 68.3, 68.4; 123/41.01, 123/41.08
See application file for complete search history.

(56) References Cited

U.S. PATENT DOCUMENTS

| | | | |
|---|---|---|---|
| 4,019,595 A | 4/1977 | Imai et al. | |
| 4,445,587 A * | 5/1984 | Hillman | 180/229 |
| 4,478,306 A | 10/1984 | Tagami | |
| 4,516,630 A | 5/1985 | Yamaguchi | |
| 4,519,473 A | 5/1985 | Ochiai et al. | |
| 4,577,720 A | 3/1986 | Hamane et al. | |
| 4,582,158 A | 4/1986 | Hamane | |
| 4,633,965 A * | 1/1987 | Tsurumi et al. | 180/229 |
| 4,640,341 A | 2/1987 | Ozawa | |
| 4,660,624 A | 4/1987 | Yamaguchi | |
| 4,673,032 A | 6/1987 | Hara et al. | |
| 4,964,484 A | 10/1990 | Buell | |
| 5,145,023 A * | 9/1992 | Tsurumi et al. | 180/68.1 |
| 5,176,111 A | 1/1993 | Nakamura et al. | |
| 5,566,746 A | 10/1996 | Reise | |
| 5,715,904 A | 2/1998 | Takahashi et al. | |
| 5,984,035 A | 11/1999 | Katoh et al. | |
| 6,105,701 A | 8/2000 | Buell | |
| 6,129,167 A * | 10/2000 | Mabary | 180/229 |
| 6,238,017 B1 | 5/2001 | Eitel | |
| 6,695,088 B2 | 2/2004 | Schroeder | |
| 6,998,970 B2 * | 2/2006 | Conte | 340/432 |
| 7,077,230 B2 | 7/2006 | Arnold | |
| 7,131,511 B2 | 11/2006 | Arnold | |
| 7,143,854 B2 | 12/2006 | Arnold | |
| 7,150,334 B2 | 12/2006 | Kodan et al. | |
| 7,159,682 B2 | 1/2007 | Arnold | |
| 7,188,696 B2 | 3/2007 | Arnold | |
| 7,195,263 B2 * | 3/2007 | Ishikawa | 280/219 |
| 7,284,632 B2 | 10/2007 | Ito et al. | |
| 7,484,767 B2 | 2/2009 | Tsuya | |
| 7,743,868 B2 * | 6/2010 | Buell | 180/229 |
| 2006/0076177 A1 | 4/2006 | Arnold | |

* cited by examiner

*Primary Examiner* — Hau Phan
(74) *Attorney, Agent, or Firm* — Michael Best & Friedrich LLP

(57) ABSTRACT

A motorcycle including at least two wheels. The at least two wheels include a front wheel and a rear wheel, the rear wheel defining a rotational axis. The motorcycle includes an engine for driving at least one of the wheels. A radiator assembly includes a radiator configured to receive coolant from the engine and dissipate heat from the coolant. The radiator assembly further includes an inlet guide configured to direct air toward the radiator. The inlet guide has an inlet opening positioned closer to the rear wheel than the front wheel. At least a portion of the inlet opening is positioned below the rotational axis of the rear wheel.

19 Claims, 4 Drawing Sheets

RADIATOR MOUNTING FOR A MOTORCYCLE

CROSS-REFERENCE TO RELATED APPLICATIONS

This application is a continuation of U.S. patent application Ser. No. 11/765,524, filed Jun. 20, 2007, now U.S. Pat. No. 7,743,868, the entire contents of which are incorporated by reference herein.

BACKGROUND

The present invention relates to motorcycles, and particularly to the positioning of a radiator on a motorcycle.

Many motorcycles have engines that are cooled using a liquid, commonly referred to as a coolant. The coolant typically is pumped through passageways in the engine to remove heat from the engine. The liquid is then pumped to a radiator, where the heat is transferred to ambient air.

It is common to mount the radiator up near the front of the motorcycle so that fresh air is forced through the radiator for cooling purposes. In some cases, a fan is positioned immediately in front of or behind the radiator in order to force air through the radiator.

SUMMARY

The present invention was developed as a result of the recognition that radiators can be positioned in other locations on the motorcycle for functional and/or aesthetic reasons. For example, in some circumstances, the presence of a radiator near the front of the motorcycle can result in hot air exiting the radiator and passing over the engine, thus adding heat back to the engine. Also, hot air exiting a front-mounted radiator can, in some circumstances, pass over the rider, which can make the rider uncomfortably warm. The positioning of a radiator at the front of a motorcycle can also be very conspicuous and aesthetically undesirable.

The present invention provides a motorcycle having at least one front wheel, at least one rear wheel, an engine for driving at least one of the wheels, coolant positioned at least partially in the engine, and a radiator assembly containing at least a portion of the coolant. In one aspect of the invention, the radiator assembly includes a radiator having an upper portion that is positioned forward of a lower portion (e.g., by at least about 15 degrees, and preferably at least about 30 degrees, relative to a vertical axis).

In a different aspect, the radiator has an inlet surface into which air is received and an outlet surface through which air is expelled. In this aspect, the inlet surface faces downward (e.g., by at least about 15 degrees, and preferably at least about 30 degrees, relative to a horizontal axis).

In another aspect, the radiator assembly further includes an inlet guide positioned near the inlet surface and having an inlet opening. In this aspect, at least a portion of the inlet opening is positioned at an elevation lower than the outlet surface. Preferably, the inlet opening is positioned at an elevation below the top surface of the front wheel, and most preferably below the rotational axis of the front wheel. In one embodiment, the inlet opening is positioned below the seat.

In yet another aspect, the radiator assembly further includes both an inlet guide positioned near the inlet surface and having an inlet opening, and an outlet guide positioned near the outlet surface and having an outlet opening. In this aspect, at least a portion of the outlet opening is positioned at an elevation higher than the inlet opening.

Other aspects of the invention will become apparent by consideration of the detailed description and accompanying drawings. Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
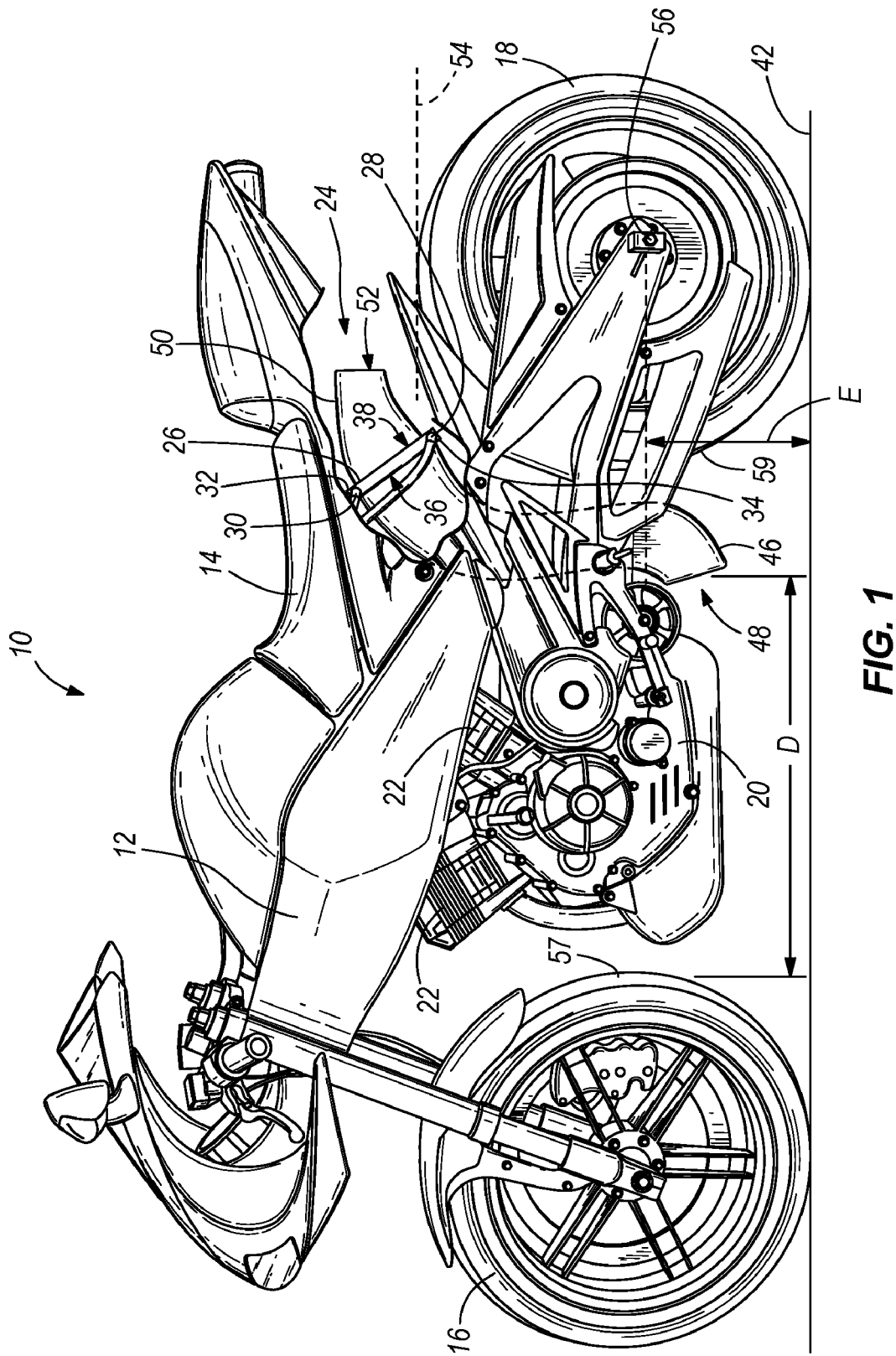
FIG. 1 is a side view of a motorcycle embodying the various aspects of the present invention.
Figure 2:
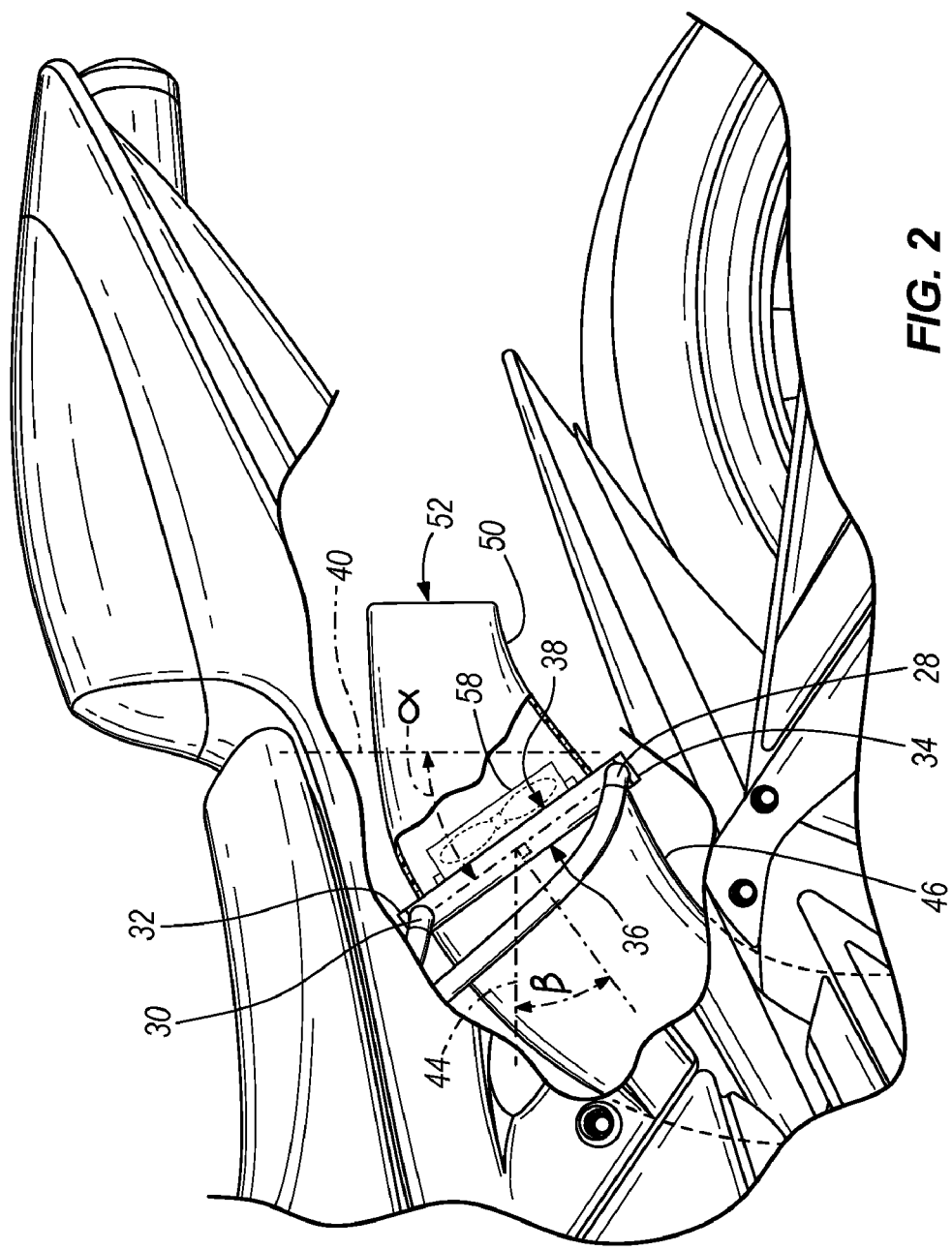
FIG. 2 is an enlarged side view of the motorcycle of FIG. 1.

The motorcycle 10 of FIG. 1 includes a frame 12, a seat 14, a front wheel 16, a rear wheel 18, and an engine 20. The engine 20 provides power to the rear wheel 18 through a transmission. The engine 20 includes two cylinders 22 for combusting an air-fuel mixture.

The illustrated motorcycle 10 further includes a radiator assembly 24 for cooling the engine 20. More specifically, coolant is pumped through the engine 20 where it absorbs heat from the engine 20. The coolant is then pumped to the radiator assembly 24 to expel heat to the ambient air. The illustrated radiator assembly 24 includes a radiator 26 having a coolant inlet 28 for receiving coolant from the engine 20 and a coolant outlet 30 for passing coolant back to the engine 20, as is generally known in the art. A pump (not shown) circulates the coolant between the engine and the radiator.

The radiator 26 is positioned rearward of the engine 20 in front of the rotational axis 56 of the rear wheel 18, and directly below the seat 14. The radiator 26 includes an upper portion 32 defined by the upper most end of the radiator, a lower portion 34 defined by the lower most end of the radiator, an inlet surface 36 into which air is received, and an outlet surface 38 through which air is expelled. The upper portion 32 of the radiator 26 is positioned forward of the lower portion 34. In the illustrated embodiment, the upper portion 32 is positioned forward of the lower portion 34 by an angle $\alpha$ of about 37 degrees relative to a vertical axis 40. In addition, the inlet surface 36 of the illustrated radiator faces downward (i.e., at least partially toward the ground surface 42), and the outlet surface 38 faces generally upward (i.e., at least partially away from the ground surface 42). The illustrated inlet surface faces downward by an angle $\beta$ of about 37 degrees relative to a horizontal axis 44.

The illustrated radiator assembly further includes an inlet guide 46 positioned near the inlet surface 36 and having an inlet opening 48, and an outlet guide 50 positioned near the outlet surface 38 and having an outlet opening 52. The inlet opening 48 is positioned at an elevation lower than the outlet surface 38 and also lower than the outlet opening 52. In addition, it can be seen that the inlet opening 48 is positioned at an elevation below the top surface 54 of the rear wheel 18 and below the rotational axis 56 of the rear wheel 18. A fan 58 is positioned in the outlet guide 50 to assist with air movement through the radiator 26.

The inlet opening 48 is positioned immediately in front of the rear wheel 18, rearward of the engine and transmission, and below the elevation E of the rotational axis 56 of the rear wheel 18. More specifically, the inlet opening 48, is closer to the rear wheel 18 than to the front wheel 16. In the motorcycle of FIG. 1, the inlet opening 48 is about 80% of the distance from the rear edge 57 of the front wheel 16 to the front edge 59 of the rear wheel 18. In addition, it is noted that the inlet opening 48 is spaced behind the rear edge of the front wheel 16 by a distance D that exceeds the diameter of the front wheel 16. This positions the inlet opening 48 directly below the seat 14, in the illustrated embodiment. This positioning advantageously places the inlet opening 48 at a location of relatively high air pressure, thus enhancing the flow of air through the radiator assembly 24.

The above-described, angled orientation of the radiator facilitates upward movement of air from the inlet surface to the outlet surface. As air passes through the radiator, it is heated, which causes the air to rise. This tendency for the air exiting the radiator to rise facilitates the flow of air through the radiator assembly, even when the motorcycle is standing still.

Figure 3:
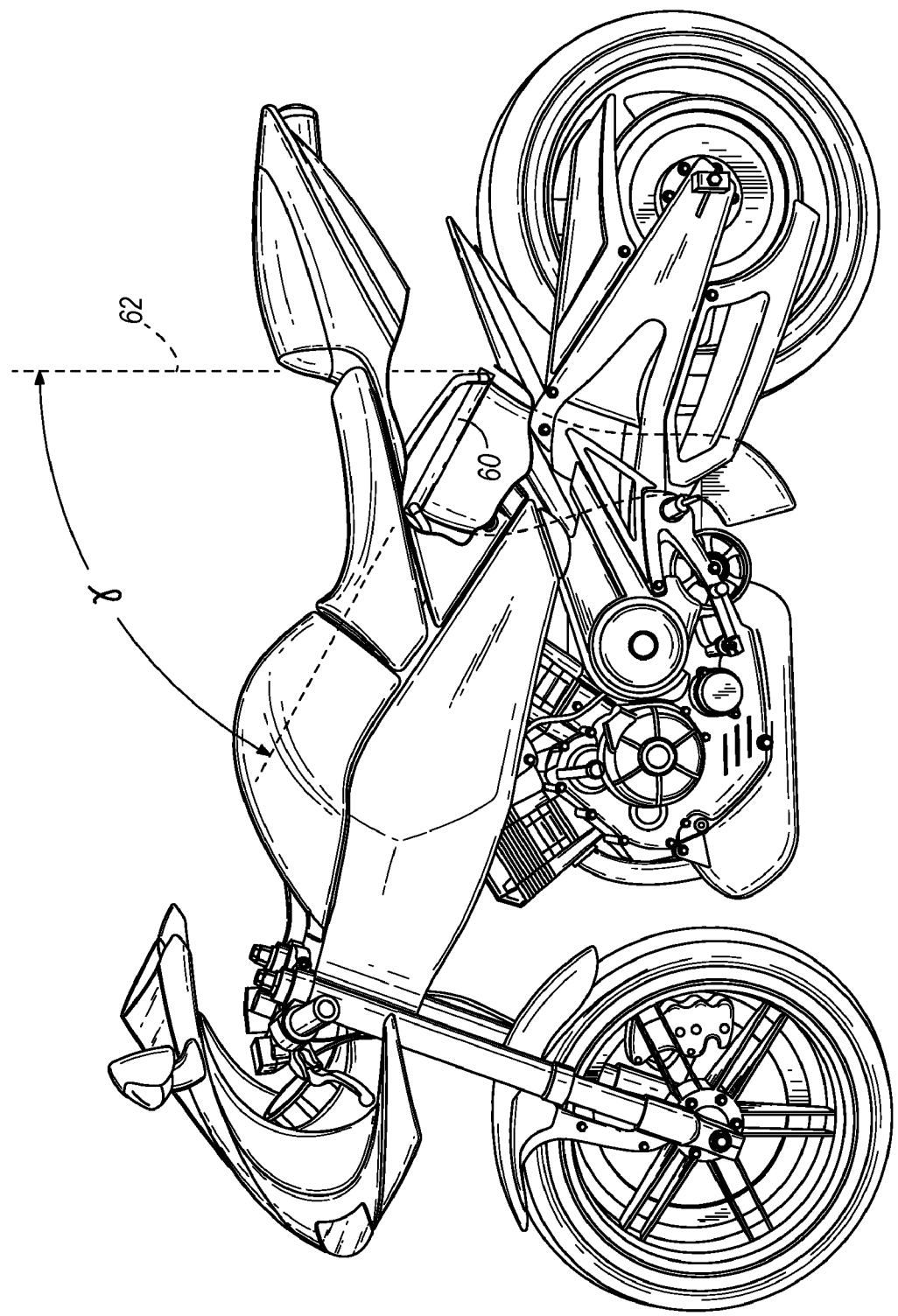
FIG. 3 is a side view of a motorcycle corresponding with a second embodiment of the present invention.

FIG. 3 illustrates a second embodiment of the present invention. The illustrated motorcycle includes a radiator 60 that is tilted to an angle α of about 61 degrees relative to a vertical axis 62. This increased angling of the radiator allows for the use of a larger radiator compared to that shown in FIG. 1.

Figure 4:
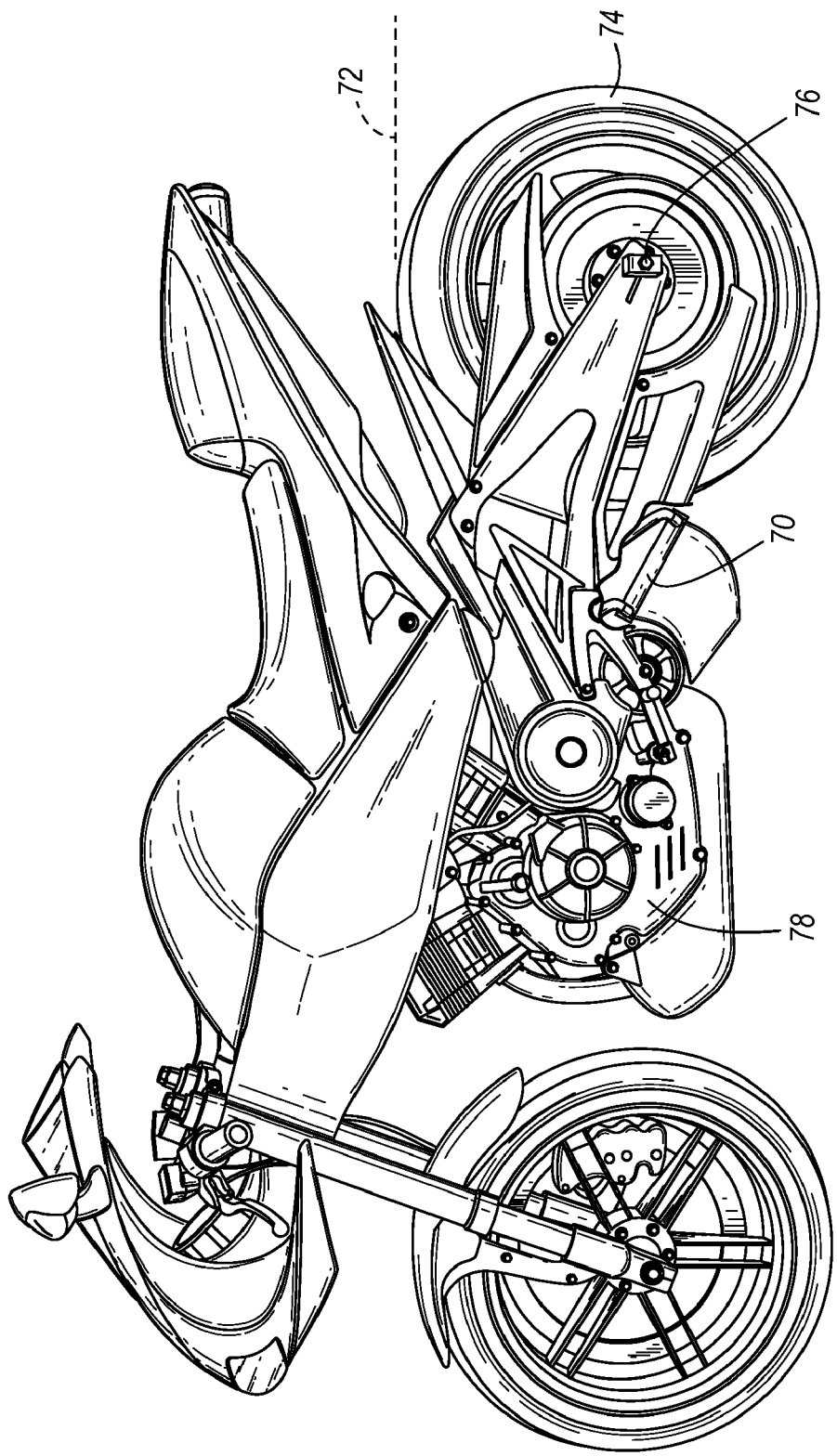
FIG. 4 is a side view of a motorcycle corresponding with a third embodiment of the present invention.

FIG. 4 illustrates a third embodiment of the present invention. The illustrated motorcycle includes a radiator 70 that is positioned below a top surface 72 of the rear wheel 74 and is substantially aligned with the vertical height of the rotational axis 76 of the rear wheel 74. This embodiment positions the radiator 70 immediately between the engine 78 and the rear wheel 74.

What is claimed is:

1. A motorcycle comprising:
   at least two wheels, the at least two wheels including a front wheel and a rear wheel, the rear wheel defining a rotational axis;
   an engine for driving at least one of the wheels; and
   a radiator assembly including
      a radiator configured to receive coolant from the engine and dissipate heat from the coolant, and
      an inlet guide configured to direct air toward the radiator, the inlet guide having an inlet opening positioned closer to the rear wheel than the front wheel and at least a portion of which is positioned below the rotational axis of the rear wheel.

2. The motorcycle of claim 1, wherein the radiator is positioned substantially rearward of the engine.

3. The motorcycle of claim 1, wherein the radiator has an inlet surface into which air is received and an outlet surface through which air is expelled, and wherein the inlet surface faces downward.

4. The motorcycle of claim 3, wherein a portion of the inlet guide is positioned adjacent the inlet surface of the radiator.

5. The motorcycle of claim 1, wherein the motorcycle further includes a seat, and wherein the inlet opening is positioned directly below the seat.

6. The motorcycle of claim 1, wherein the inlet opening is positioned at a distance from a rear edge of the front wheel that is about 80 percent of a distance from the rear edge of the front wheel to a front edge of the rear wheel.

7. The motorcycle of claim 1, wherein the inlet opening is spaced behind a rear edge of the front wheel by a distance that exceeds a diameter of the front wheel.

8. The motorcycle of claim 1, wherein the inlet opening is positioned immediately in front of the rear wheel.

9. The motorcycle of claim 1, wherein the inlet opening is positioned entirely at an elevation below the rotational axis of the rear wheel.

10. A motorcycle comprising:
    at least two wheels, the at least two wheels including a front wheel and a rear wheel, the rear wheel defining a rotational axis;
    an engine for driving at least one of the wheels; and
    a radiator assembly including
       a radiator configured to receive coolant from the engine and dissipate heat from the coolant, and
       an inlet guide configured to direct air toward the radiator, the inlet guide having an inlet opening facing at a downward angle at a position rearward of the engine and forward of the rear wheel.

11. The motorcycle of claim 10, wherein at least a portion of the inlet opening is positioned below the rotational axis of the rear wheel.

12. The motorcycle of claim 10, wherein the inlet opening is positioned entirely at an elevation below the rotational axis of the rear wheel.

13. The motorcycle of claim 10, wherein the radiator has an inlet surface into which air is received and an outlet surface through which air is expelled, and wherein the inlet surface faces downward.

14. The motorcycle of claim 13, wherein a portion of the inlet guide is positioned adjacent the inlet surface of the radiator.

15. The motorcycle of claim 10, wherein the motorcycle further includes a seat, and wherein the inlet opening is positioned directly below the seat.

16. The motorcycle of claim 10, wherein the inlet opening is positioned at a distance from a rear edge of the front wheel that is about 80 percent of a distance from the rear edge of the front wheel to a front edge of the rear wheel.

17. The motorcycle of claim 10, wherein the inlet opening is spaced behind a rear edge of the front wheel by a distance that exceeds a diameter of the front wheel.

18. A motorcycle comprising:
    at least two wheels, the at least two wheels including a front wheel and a rear wheel; an engine for driving at least one of the wheels; and
    a radiator assembly including
       a radiator configured to receive coolant from the engine and dissipate heat from the coolant, and
       an inlet guide configured to direct air toward the radiator, the inlet guide having an inlet opening, the inlet guide extending substantially vertically upward from the inlet opening toward the radiator, wherein the inlet guide is positioned rearward of the engine, and the inlet opening is exposed to a space rearward of the engine and forward of the rear wheel.

19. The motorcycle of claim 18, wherein the inlet opening is positioned entirely below a rotational axis of the rear wheel.

* * * * *